SUPERATMOSPHERIC FLUID PRESSURE SERVOMOTOR

Original Filed Feb. 2, 1967 3 Sheets-Sheet 1

SUPERATMOSPHERIC FLUID PRESSURE SERVOMOTOR

Original Filed Feb. 2, 1967 3 Sheets-Sheet 2

SUPERATMOSPHERIC FLUID PRESSURE SERVOMOTOR

Original Filed Feb. 2, 1967 3 Sheets-Sheet 3

United States Patent Office

Re. 28,191
Reissued Oct. 8, 1974

28,191
SUPERATMOSPHERIC FLUID PRESSURE SERVOMOTOR

Oswald O. Kytta and Thomas M. Julow, South Bend, Ind., assignors to The Bendix Corporation Original No. 3,410,179, dated Nov. 12, 1968, Ser. No. 613,486, Feb. 2, 1967. Application for reissue Jan. 14, 1972, Ser. No. 217,983, which is a continuation of abandoned application Ser. No. 40,020, May 25, 1970.
Int. Cl. F01b *19/00;* F15b *9/10*
U.S. Cl. 91—376 10 Claims

Matter enclosed in heavy brackets [ ] appears in the original patent but forms no part of this reissue specification; matter printed in italics indicates the additions made by reissue.

ABSTRACT OF THE DISCLOSURE

An adapter for a vacuum suspended fluid pressure servomotor which will permit the introduction of superatmospheric air to the control valve.

*This is a continuation of application Ser. No. 40,020, filed May 25, 1970, now abandoned.*

SUMMARY

With the ever increasing number of accessories being attached to the engine, it is quite apparent that the engine compartment for present day vehicles and future vehicles is becoming quite crowded. It is therefore incumbent upon any producer of accessory equipment that is to be installed in this compartment to make the equipment as small and as compact as possible.

It is also equally true with regard to power brake servomotors that the demands of the braking systems are increasing in that with the acceptance of disc brakes, line pressures need to be increased by one-third. Thus in order to develop 1,200–1,300 p.s.i. line pressures with present day servomotors of the pneumatic type they will have to grow in size.

So long as pneumatic type power brake servomotors are being considered the most adequate answer to power braking in automobile vehicles, it is therefore an obvious intent of this invention to provide a means for the servomotor that will increase the force output of the servomotor without increasing the size and number of parts thereof.

DRAWING DESCRIPTION

DETAILED DESCRIPTION

Figure 1:
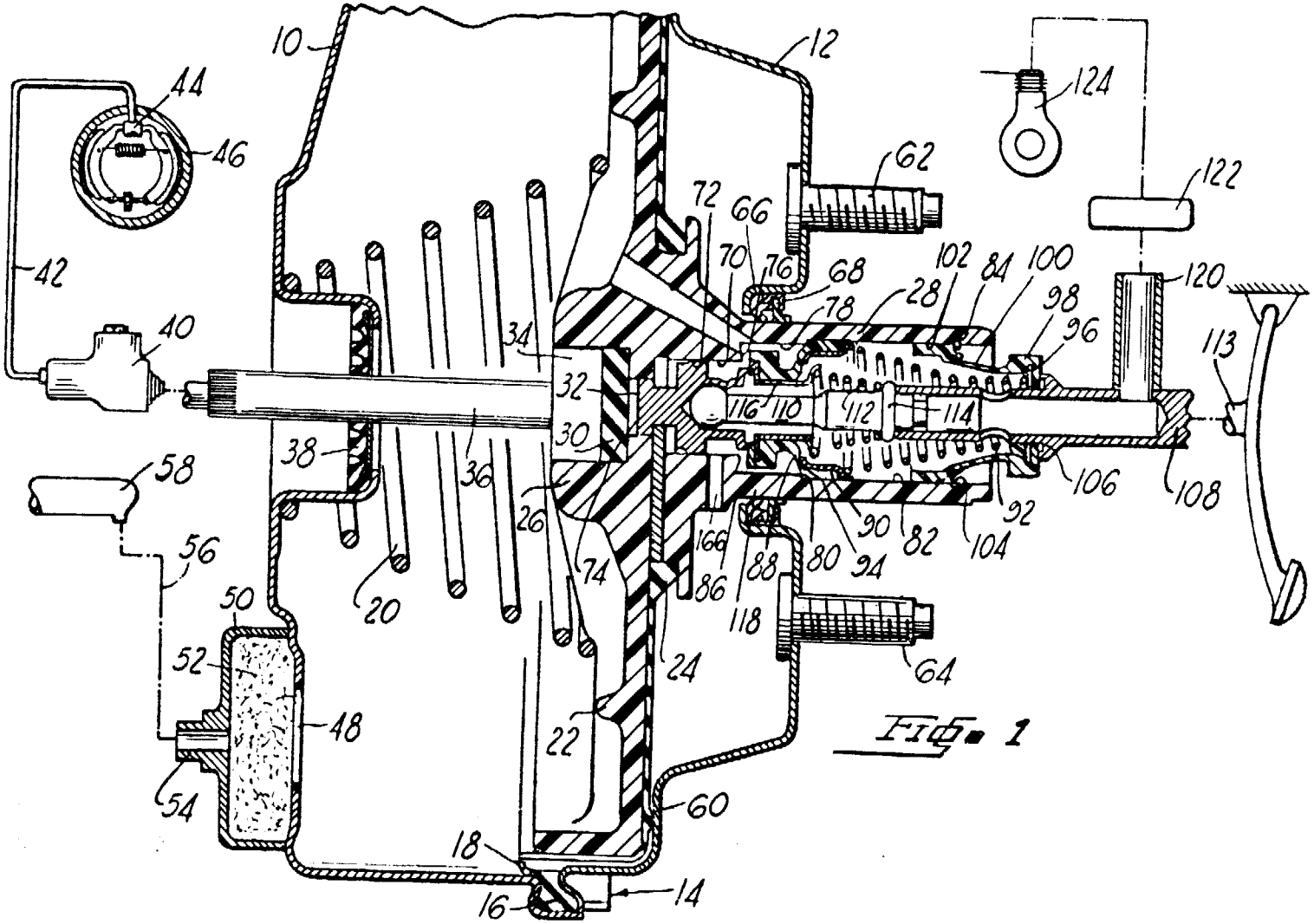
FIG. 1 is a schematic power braking system for an automotive vehicle showing a servomotor embodying the principles of this invention in broken cross section.

With reference now to FIG. 1 there is shown a servomotor having a front shell 10 and a rear shell 12 joined together by a twist lock connection, as at 14 with a bead 16 of a diaphragm 18 interposed between the shell portions to seal the connection thereof. Within the shell there is inserted a return spring 20 arranged to operatively engage a plastic wall 22 against which the diaphragm 18 sealingly rests with its inner bead 24 within a recess of the plastic wall 22. The plastic wall 22 is provided with a forward boss 26 and a rearward boss 28. Within the forward boss a deformable disc 30 is held over an opening 32 connecting the internal bores of the bosses together by a head 34 of a force transmitting rod 36 that projects through the front shell 10 through a seal 38 about an opening in the front shell. The force transmitting rod 36 is connected, as shown, to a master cylinder 40 which is in turn hydraulically communicated by conduit 42 to the wheel cylinders 44 of the vehicle wheel brakes 46, one of which is shown.

The front shell 10 is also provided with a radially disposed opening 48 over which a cap 50 is placed with a filtering medium 62 interposed and having a fitting 54 that is communicated by a hose 56 or the like to an engine intake manifold 58 of the vehicle.

The return spring 20 in the non-actuated condition of the servomotor holds the movable wall to the rear of same whereby raised portions 60 of the diaphragm 18 abut on the rear shell 12. The rear shell 12 is provided with mounting bolts 62 and 64 that may be welded thereto and with an inwardly turned boss 66 for mounting a bearing seal 68 that cooperates with the boss 28 to permit sealed reciprocatory motion of the wall 22 and its boss 28.

As seen, the boss 28 is hollowed out to have a stepped chamber therein whose smaller portion 70 slidably guides a reaction plunger 72 having a reaction face 74 within the opening 32 communicating the interior of the bosses 26 and 28. A valve seat 76 is formed within the boss 28 immediately behind the portion 70 at the point where the bore diameter is increased to that of portion 78, and a shoulder 80 is formed immediately therebehind to separate the intermediate portion 78 from the largest diameter portion 82. Adjacent the open end of the boss 28 there is provided a groove 84. A flexible grommet valve having a valve flange 86 connected by a diaphragm portion 88 to a mounting flange 90 in inserted to have the mounting flange bearing against the shoulder 80 of the boss 28. It is held in this position by a valve return spring 92 that bears against a mounting flange retainer 94 and a reinforcing plate 96 in a face 98 of an adapter in the form of a grommet 100. Grommet 100 is also provided with a mounting flange 102 held within the boss 28 by a snap ring 104 in the groove 84. As seen, the face 98 bears against a flange 106 of a hollow portion 108 between portions 110 and 113 of the push rod assembly. The portion 110 contains a ball end that is fitted within the reaction plunger 72 and held thereto by swaging the reaction plunger 72 to the ball end. In addition, a valve follow-up spring 112 is provided between a flange 114 on the push rod portion 110 and a retainer 116 that bears against a reinforcing plate 118 in the valve flange 86. The hollow portion 108 is provided with a conduit 120 that is communicated to a compressed air reservoir 122 by means of a conduit, which compressed air reservoir 122 is in turn communicated by a conduit to an air compresser 124, such as a smog control blower of the vehicle engine.

Figure 2:
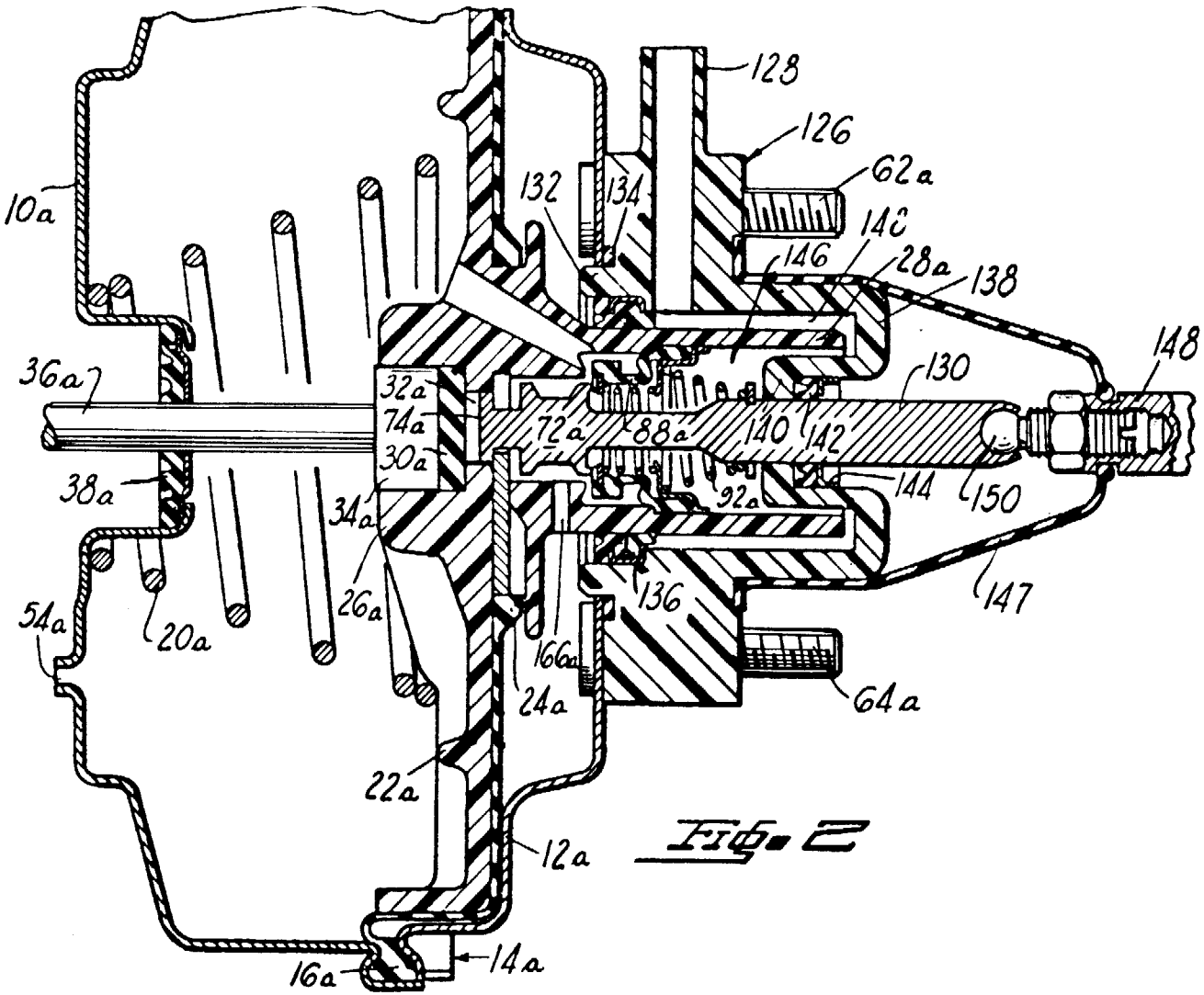
FIG. 2 is a partial cross section of a servomotor fitted with a modified adapter in accordance with the principles of this invention.
Figure 3:
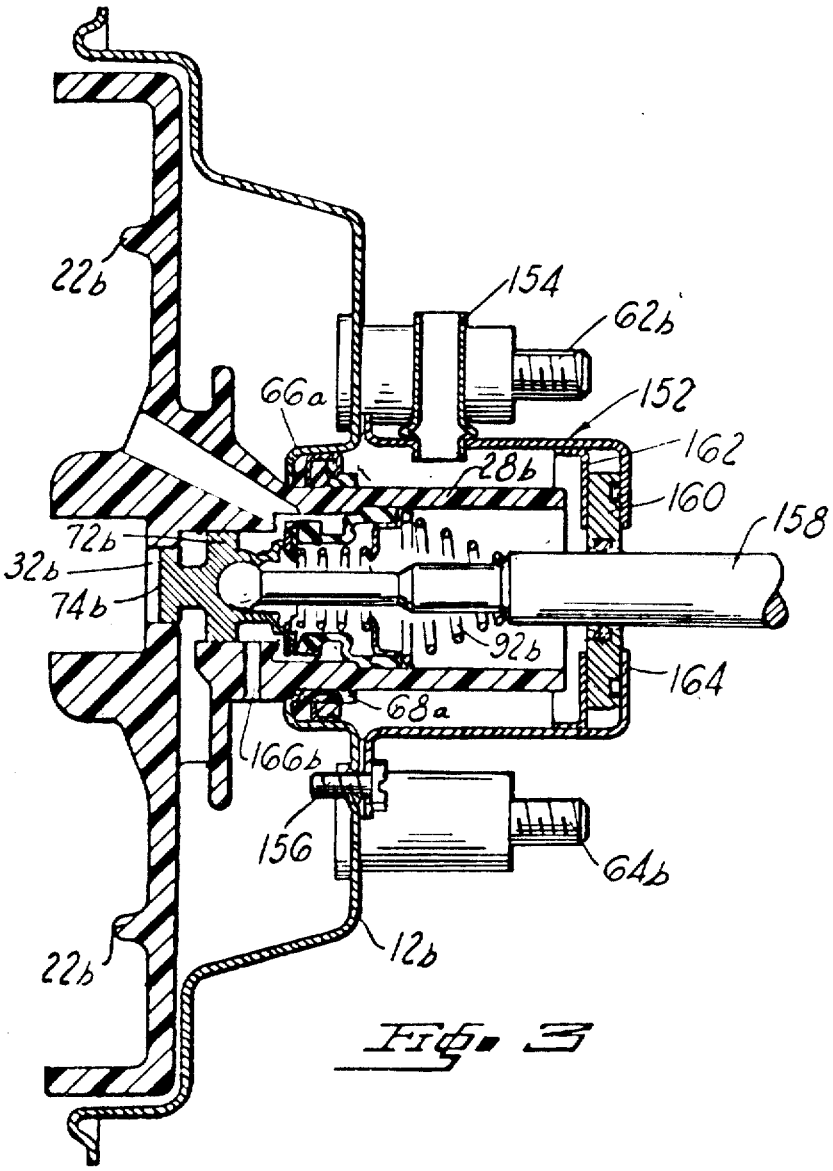
FIG. 3 is a partial cross sectional view of the rear shell and movable wall and another modification of an adapter to be attached to the rear shell in accordance with the principles of this invention.

As for the structure of FIGS. 2 and 3, the elements which are similar to those in FIG. 1 have been designated with the use of a subscript a or b after the same number that is applicable to that element in FIG. 1. Essentially the servomotor unit, as will be readily observed, is identical to that of FIG. 1. It is only in the construction of different adapters 126 or 152 having fittings 128 and 154 for connection to the air reservoir tank, such as provided in the system of FIG. 1, that the differences between the servomotors may be found. One other difference that is noticeable is in the construction of the push rods 130 and 158 versus the push rod assembly in FIG. 1.

With more particular regard to these differences between FIGS. 1 and 2, it is found that the adapter 126 is formed as a plastic housing that has appropriate drilled openings therethrough receiving the bolts 62a and 64a so as to mount the plastic adapter construction to the rear shell 12a. In addition, the adapter has a boss 132 that fits within an opening in the rear shell 12a and an annular seal groove containing a seal 134 is provided in the plastic body 126 to seal the juncture of the adjuster 126 to the shell 12a. Inwardly of the boss 132 a guiding type seal 136 is provided to permit reciprocatory motion of the boss 28a of the movable wall 22a. The adapter body 126 is formed to have a cup-shaped cavity closed by an end 138 having an inwardly turned boss 140 which has an opening therethrough for the reciprocatory support of the push rod end 130 and a seal 142 held by a retainer 144 is fitted about the push rod 130 and held to the boss 140 to thereby seal the pressure chamber 146 that is communicated by means of passages 148 between the adapter body 126 and the tubular boss 28a to the fitting 128 leading to the air reservoir, as seen in FIG. 1.

Thus the push rod end 130 is guided at spaced points by the boss 140 and by the movable wall structure adjacent the opening 32a between the cavity in the forward boss 26a and the rearward tubular boss 28a. In order to prevent contaminants from effecting the life of the seal 142 a rubber boot 147 is fitted to the boss and to a portion 148 having a spherical connection 150 with the push rod portion 130 of the push rod assembly leading from the brake pedal, as seen in FIG. 1.

With respect to the modification shown by FIG. 3, the only difference between this and the adapter 126 of FIG. 2 is that this adapter is formed as a stamped cup-shaped housing 152 to which a fitting 154 is affixed and which is bolted by means of bolts 156 to the rear shell 12b of the servomotor. In this construction a more standard valve arrangement, as will be familiar to those skilled in the art to this type of servomotor, is utilized with no change in the valving and the push rod 158. The cup-shaped housing 152 is provided with a sealing plate 160 which is arranged to be held between a plate 162 and the inwardly turned flange 164 of the housing 152 for radial movement in order to accommodate arcuate action of the push rod 158.

OPERATION

Having fully described various embodiments of my invention which are all generally similar in operation, the operation of FIG. 1 will now be set forth as being generally descriptive of the operation of the units depicted in FIGS. 2 and 3 as well as follows:

Upon actuation of the brake pedal shown connected to the three part push rod assembly 108, 110 and 112, the reaction plunger 72 will move inwardly to close the gap between the head 74 and the deformable disc 30 and at the same time permit seating of the valve flange on the movable wall to close off vacuum suspension of the chambers on either side of the wall 22 and diaphragm 18. Further inward motion of the brake pedal which results in further inward motion of the reaction plunger 72 will move the valve seat formed on the rear face of the reaction plunger 72 from the valve face 86 of the poppet valve thereby communicating the chamber internally of the flexible poppet valve to the radial passage 166 through the tubular boss to port the air from the reservoir 122 to the chamber to the rear of the wall 22 and diaphragm 18.

Since this pressure is superatmospheric this will create an immediate pressure differential across the wall 22 and diaphragm 18 to project the force transmitting rod 36 and pressurize the master cylinder 40 to create a hydraulic pressure in the wheel cylinders 44 and thereby actuate the vehicle brakes 46.

As the release is considered to be self-evident no further description is deemed necessary.

Having described a manner of construction and an operative arrangement of the construction, it is now desired to set forth the intended protection sought by these Letters Patent as follows:

We claim:

1. A fluid pressure servomotor comprising:

a housing;

a movable wall in the housing which divides the internal area of the housing into first and second variable volume chambers, said movable wall containing an operator-operated valve means within a tubular boss means of the movable wall, said boss means having a portion extending exteriorly of the housing; and a means to admit superatmospheric air to the interior of the tubular boss means, said means including an [adaptor] *adapter* operatively connected to said tubular boss and said operator-operated valve means, said means segregating an area from the surrounding environment about said housing inclusive of a space between said tubular boss means and said operator-operated valve means, said means being further provided with conduit means communicating said superatmospheric air internally of said adapter to said operator-operated valve means for control thereby in operating said servomotor, said adapter is characterized as a cup-shaped structure affixed to the housing about an opening therethrough through which the tubular boss extends with the cup-shaped structure having an opening for sealing and slidably supporting a push rod forming a portion of said operator-operated valve means.

2. The structure of Claim 1 wherein said adapter includes means to seal the opening through said housing that also cooperates with said tubular boss to sealingly guide its reciprocatory movement attendant with the creation of pressure differentials across the movable wall.

3. The structure of Claim 1 wherein the opening in said cup-shaped structure has a seal means which is radially movable to accommodate arcuate motion that accompanies actuation of the push rod.

*4. A servomotor for use in a power braking system, having an output force created by an operational pressure differential produced between a source of vacuum and a source of air pressurized above atmospheric pressure, said servomotor comprising:*

*a housing formed of a front shell and a rear shell locked together;*

*wall means which divides the interior of said housing into a first variable volume chamber and a second variable volume chamber;*

*a boss integral with said wall means having a portion which extends through said rear shell, said boss having an internal bore;*

*means connecting said first variable volume chamber with said source of vacuum for communicating vacuum to said first variable volume chamber;*

*conduit means connected to said source of air pressurized above atmospheric pressure;*

*adapter means attached to said conduit means for communicating said source of pressurized air to the internal bore of said boss;*

*seal means cooperating with said adapter means to form a pressure chamber adjacent the internal bore of said boss, said seal means preventing air at atmospheric pressure from entering said internal bore;*

*actuating means including a push rod, said seal means permitting said push rod to move both axially and radially in response to an input force, said push rod extending into said internal bore of the boss;*

*valve means located in said internal bore of the boss and connected to said push rod for commuicating vacuum through an access passage to said second variable volume chamber to suspend said wall means when said actuating means is in a rest position and for regulating the flow of said source of air above atmospheric pressure to said second variable volume chamber to replace the vacuum therein upon movement of said push rod which push rod movement*

*closes said access passage and thereby creates said operational pressure differential across said wall means, said pressure differential causing said wall means to move; and*

*a force transmitting member response to movement of said wall means for transmitting said output force.*

*5. The servomotor, as recited in Claim 4, wherein said adapter is connected to said push rod.*

*6. The servomotor, as recited in Claim 4, wherein said seal means includes:*

*a flexible boot secured to said boss member for preventing ingress of contaminants to said valve means located in said internal bore.*

*7. The servomotor, as recited in Claim 4, wherein said adapter means includes:*

*a cup-shaped member secured to said housing and having an opening therein through which said boss extends and an opening for receiving said seal means for guiding said push rod into operative engagement with said valve means.*

*8. The servomotor, as recited in Claim 7, wherein said seal means is radially movable to compensate for arcuate motion of the push rod upon actuation.*

*9. The servomotor, as recited in Claim 5, wherein said adapter means connected to said push rod has an internal bore connected to said conduit means for communicating said source of air above atmospheric pressure to said valve means.*

*10. A fluid pressure servomotor comprising:*

*a housing;*

*movable wall means in the housing which divides the internal area into first and second variable volume chambers, said movable wall means containing an operator-operated valve means within an integral boss means on the wall means, said boss means having a portion extending exteriorly through an opening in said housing; and*

*means to admit superatmospheric air to said boss means, said means having an adapter operatively connected to said boss means and said operator-operated valve means, said means segregating an area from the surrounding environment about said housing inclusive of a space between the boss means and the valve means, said means having conduit means for communicating said superatmosphric air through said adapter to the interior of said boss means where said valve means is adapted to control the operation of said servomotor, said adapter surrounding said opening of the housing for sealing the internal area of the housing and for slidably supporting a push rod forming a portion of the operator-operated valve means to permit said push rod to move both axially and radially.*

References Cited

The following references, cited by the Examiner, are of record in the patented file of this patent or the original patent.

UNITED STATES PATENTS

| | | | |
|---|---|---|---|
| 926,260 | 6/1909 | Klein | 91—335 |
| 3,013,533 | 12/1961 | Brown | 91—376 |
| 3,026,853 | 3/1962 | Stelzer | 91—376 |
| 3,173,338 | 3/1965 | Schultz | 91—376 |
| 3,207,042 | 9/1965 | Mayer | 91—376 |
| 3,279,327 | 10/1966 | French | 91—376 |
| 3,284,142 | 11/1966 | Bueler | 91—43 X |
| 3,316,816 | 5/1967 | Yardley | 91—376 |
| 3,358,449 | 12/1967 | Brown | 91—376 |

PAUL E. MASLOUSKY, Primary Examiner

U.S. Cl. X.R.

92--99, 110, 166, 167, 168